US00RE34482E

United States Patent [19]

Pastrick

[11] E Patent Number: Re. 34,482

[45] Reissued Date of Patent: Dec. 21, 1993

[54] APPLIANCE FOR BREWING COFFEE/TEA

[75] Inventor: John J. Pastrick, University Heights, Ohio

[73] Assignee: Mr. Coffee, Inc., Bedford Heights, Ohio

[21] Appl. No.: 794,879

[22] Filed: Nov. 19, 1991

Related U.S. Patent Documents

Reissue of:

[64] Patent No.: 4,882,983
Issued: Nov. 28, 1989
Appl. No.: 297,307
Filed: Jan. 17, 1989

[51] Int. Cl.[5] ..... A47J 31/00
[52] U.S. Cl. ..... 99/295; 99/299
[58] Field of Search ..... 99/295, 299, 279, 306, 99/300, 302 R, 304, 305, 307, 190, 316; 426/433

[56] References Cited

U.S. PATENT DOCUMENTS

| | | | |
|---|---|---|---|
| 966,735 | 8/1910 | Chapman . | |
| 2,684,624 | 7/1954 | Alvarez . | |
| 2,948,618 | 8/1960 | Saint . | |
| 2,951,431 | 9/1960 | Hugentobler . | |
| 3,080,810 | 3/1963 | Saint . | |
| 3,484,245 | 12/1969 | Goto . | |
| 3,592,125 | 7/1971 | Toimie . | |
| 3,669,694 | 6/1972 | Nauheimer et al. . | |
| 3,975,996 | 8/1976 | Vitous . | |
| 4,309,939 | 1/1982 | Stover | 99/295 |
| 4,309,940 | 1/1982 | Lowerre, Jr. . | |
| 4,354,427 | 10/1982 | Filipowicz | 99/295 |
| 4,527,467 | 7/1985 | Siemensma . | |
| 4,667,587 | 5/1987 | Wunder | 99/295 |
| 4,674,400 | 6/1987 | Rondel et al. . | |
| 4,744,291 | 5/1988 | Wallin . | |
| 4,770,090 | 9/1988 | Woon et al. . | |
| 4,779,520 | 10/1988 | Hauslein | 99/295 |
| 4,784,051 | 11/1988 | Häuslein . | |
| 4,790,240 | 12/1988 | Henn et al. . | |

FOREIGN PATENT DOCUMENTS

| | | |
|---|---|---|
| 0019291 | 5/1980 | European Pat. Off. . |
| 0131935 | 8/1984 | European Pat. Off. . |
| 0163896 | 4/1985 | European Pat. Off. . |
| 0227200 | 4/1986 | European Pat. Off. . |
| 0283569 | 12/1987 | European Pat. Off. . |
| 0294579 | 4/1988 | European Pat. Off. . |
| 0299145 | 4/1988 | European Pat. Off. . |
| 0327822 | 1/1989 | European Pat. Off. . |
| 1196831 | 4/1960 | Fed. Rep. of Germany . |
| 6607861 | 5/1971 | Fed. Rep. of Germany . |
| 2137040 | 7/1971 | Fed. Rep. of Germany . |
| 2829775 | 7/1978 | Fed. Rep. of Germany . |
| 3512920 | 4/1985 | Fed. Rep. of Germany . |
| 3213784 | 12/1987 | Fed. Rep. of Germany . |
| 3743050 | 12/1987 | Fed. Rep. of Germany . |
| 8810770 | 4/1988 | Fed. Rep. of Germany . |
| 536841 | 8/1916 | France . |
| 1196574 | 3/1959 | France . |
| 1584848 | 11/1969 | France . |
| 62-11848 | 3/1987 | Japan . |
| 100411 | 8/1962 | Norway . |
| 282 | of 1877 | United Kingdom . |
| 545902 | 6/1942 | United Kingdom . |
| 2111377 | 7/1983 | United Kingdom . |
| 2135570 | 2/1984 | United Kingdom . |

*Primary Examiner*—Robert W. Jenkins
*Attorney, Agent, or Firm*—D. Peter Hochberg; Mark Kusner

[57] ABSTRACT

An appliance for automatically brewing a beverage such as coffee, tea or the like comprising a reservoir for receiving a predetermined amount of water, a heating element for heating the water, a container adapted to receive coffee, tea or the like defining a wetting chamber and means for delivering heated water to the wetting chamber. The container includes an outlet port disposed a predetermined distance above the lowest portion of the wetting chamber wherein a predetermined head of water is consistently developed and maintained throughout the brewing cycle.

19 Claims, 4 Drawing Sheets

APPLIANCE FOR BREWING COFFEE/TEA

Matter enclosed in heavy brackets [ ] appears in the original patent but forms no part of this reissue specification; matter printed in italics indicates the additions made by reissue.

FIELD OF THE INVENTION

The present invention pertains to an appliance for brewing coffee, tea or the like, and more particularly to a conventionally known automatic drip-type appliance for making coffee or tea. The invention is particularly applicable to an appliance for making fresh iced tea and will be described with particular reference thereto, although it will be appreciated that it may also be used in making hot coffee, hot tea, iced coffee or other similar beverages.

BACKGROUND OF THE INVENTION

The present invention pertains generally to conventionally-known, automatic drip-type coffee makers. Such coffee makers typically include a reservoir for water, a heating element to heat the water, and a container or basket ("brew funnel") adapted to hold the coffee (generally in a filter) and to receive the heated water. The heated water is allowed to drip onto and "wet" the coffee in the container. The brewed coffee is drained from the container through an aperture located at the bottom thereof into a decanter.

With the public popularity of tea as an alternative or substitute for coffee, it has become desirable to provide an automatic machine which is capable of brewing coffee and/or tea. Existing drip coffee makers however provide less than satisfactory results if loose tea or tea bags are used therewith. One reason is that tea, unlike coffee, must be steeped to produce a satisfactory beverage. A second reason is that automatic drip coffee makers are simply not designed for brewing or steeping tea. In this respect, the basket or brew funnels of drip coffee makers are specifically designed to develop a head of water such that the coffee therein is wetted (submerged) by the water. This head of water is dependent upon the rate the brewed coffee drains from the funnel during the brewing cycle, as well as upon the rate at which the hot water is introduced into the funnel. Importantly, the drain rate is a function of a number of factors which create a resistance to flow. Some of these factors, such as the configuration and physical dimensions of the brew funnel (e.g. flow channels, drain hole size etc.) are constant, while other factors such as the grind of the coffee (coarseness or fineness), the water hardness and the porosity of the filter paper used therein are variables. With respect to the variable factors, tea is completely unlike coffee in its wetting characteristics. Thus, machines designed for coffee in many instances do not produce the desired head of water in the brew funnel when tea is used therein. This is especially true when tea bags are used and the tea bags are placed or shift away from (i.e. do not cover) the drain aperture[,]; in such situations the drain aperture is unobstructed and the drain flow rate substantially increases, which in turn reduces the head of water in the basket. Thus, for the aforementioned reasons, making tea in drip coffee makers known heretofore in many instances produces less than optimum results.

The present invention overcomes the aforementioned problems, and provides an appliance for brewing coffee or tea, which appliance includes a brew funnel which maintains a specific water head regardless of the characteristics of the materials to be brewed or used therein.

SUMMARY OF THE INVENTION

In accordance with the present invention there is provided an appliance for automatically brewing a beverage such as coffee, tea or the like. The appliance is comprised of a reservoir for receiving a predetermined amount of water, means for heating the water, a container defining a chamber adapted to receive coffee, tea or the like, and means for delivering heated water to the chamber. The container includes an outlet port disposed a predetermined distance above the lowest portion of the chamber, which port is dimensioned to communicate with a receptacle below the chamber for receiving brewed liquid. By providing an outlet port a predetermined distance above the bottom or lowest portion of the chamber, a specific head of water is consistently established and maintained in the chamber throughout the brewing cycle. The head of water established in the steeping chamber will be consistently equal to the distance between the bottom of the chamber and the outlet port. Thus, irrespective of the characteristics of the coffee/tea being brewed therein, a predetermined head of water is established to extract the essence therefrom.

In accordance with another aspect of the present invention, there is provided an appliance as described above wherein the container further includes a drain port disposed at the bottom of the chamber and a plug movable between a first position wherein said plug closes said port and a second position wherein said port is open. The port is operable when open to drain, into a receptacle below the chamber, the head of water created in the chamber during the brewing cycle. In the present invention the plug is normally in the first position (closed) during the brewing cycle to establish the predetermined head of water. Upon completion, the plug may be moved to the second position to enable the liquid forming the head of water in the wetting chamber (brewed liquid) to be drained into the receptacle.

In accordance with another aspect of the present invention, there is provided an appliance as described above further comprising means for forcing the heated water into the chamber to agitate the particulate material (tea/coffee) therein. With respect to this aspect of the present invention, unlike existing drip coffee machines wherein the heated water "drips" into the particulate to be brewed (so as to avoid boring a hole into the particulate), the present invention generally provides a nozzle to force the heated water into the chamber of the container to agitate the particulate therein to ensure thorough wetting and extraction from the brewed particulate.

It is an object of the present invention to provide an appliance for automatically brewing fresh iced tea, iced coffee, tea or the like.

Another object of the present invention is to provide an appliance as described above which is adaptable for making hot tea or hot coffee.

A further object of the present invention is to provide an appliance as described above having a wetting chamber in which a predetermined head of heated water for brewing or steeping is consistently established and maintained regardless of whether coffee or tea is used therein and regardless of the characteristics of such particulate.

A still further object of the present invention is to provide an appliance as described above wherein the heated water used to brew or steep the coffee or tea is forced into the chamber to agitate the heated water and particulate therein.

These and other objects and advantages of the present invention will become apparent from the following description of a preferred embodiment taken together with the accompanying drawings.

DESCRIPTION OF THE DRAWINGS

The invention may take physical form in certain parts and arrangement of parts, a preferred embodiment of which will be described in detail in the specification and illustrated in the accompanying drawings wherein.

DETAILED DESCRIPTION OF PREFERRED EMBODIMENT

Figure 1:
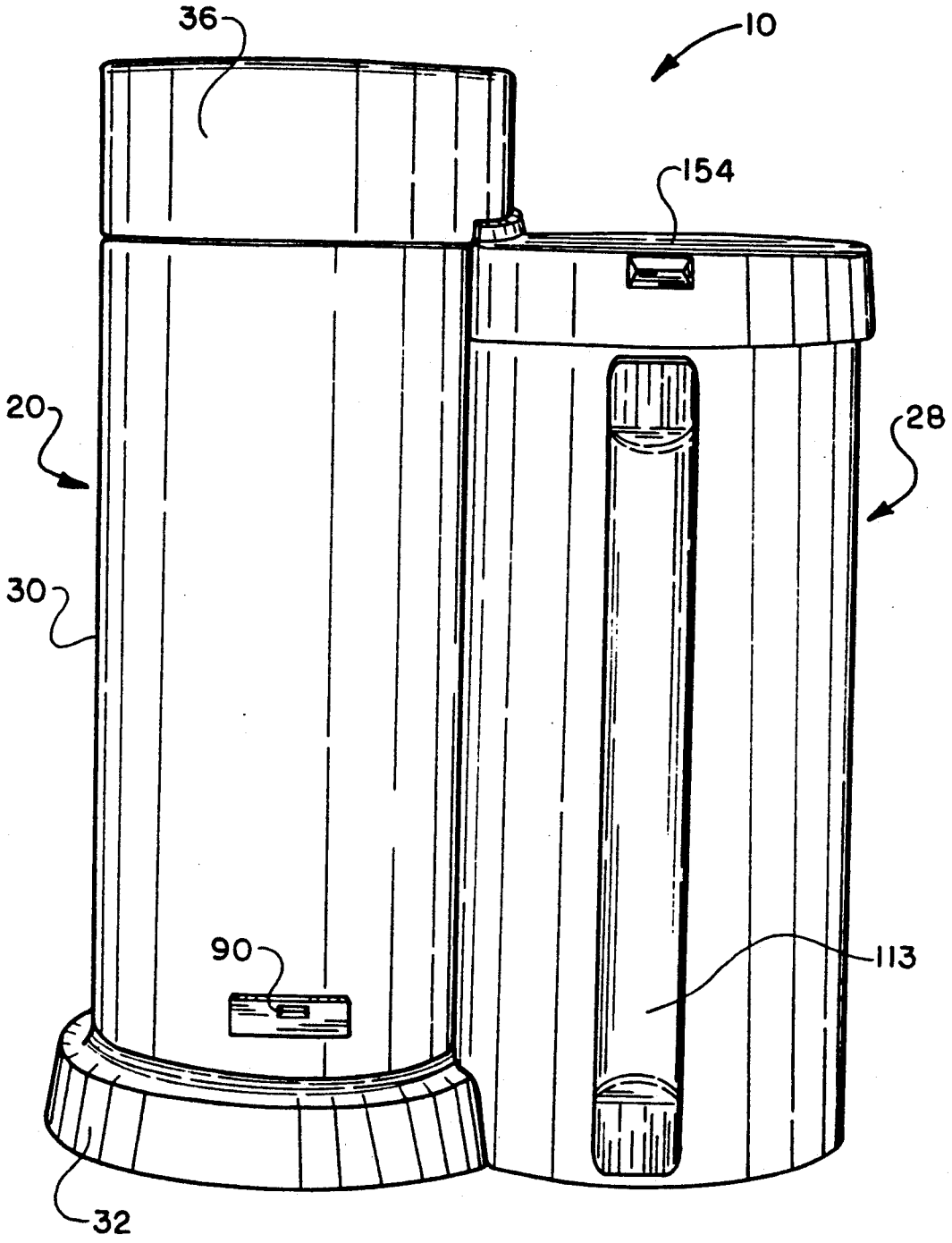
FIG. 1 is a perspective view of an appliance for making fresh iced tea illustrating a preferred embodiment of the present invention.

Referring now to the drawings wherein the showing is for the purpose of illustrating a preferred embodiment of the invention only and not for the purpose of limiting same, FIG. 1 shows an appliance 10 for making iced tea or iced coffee. Broadly stated, appliance 10 is comprised of a housing 20 containing a water reservoir 22 and a heating unit 24, a container or brew funnel 26 for receiving the coffee or tea to be brewed, and a receptacle 28 for receiving the brewed beverage.

Figure 2:
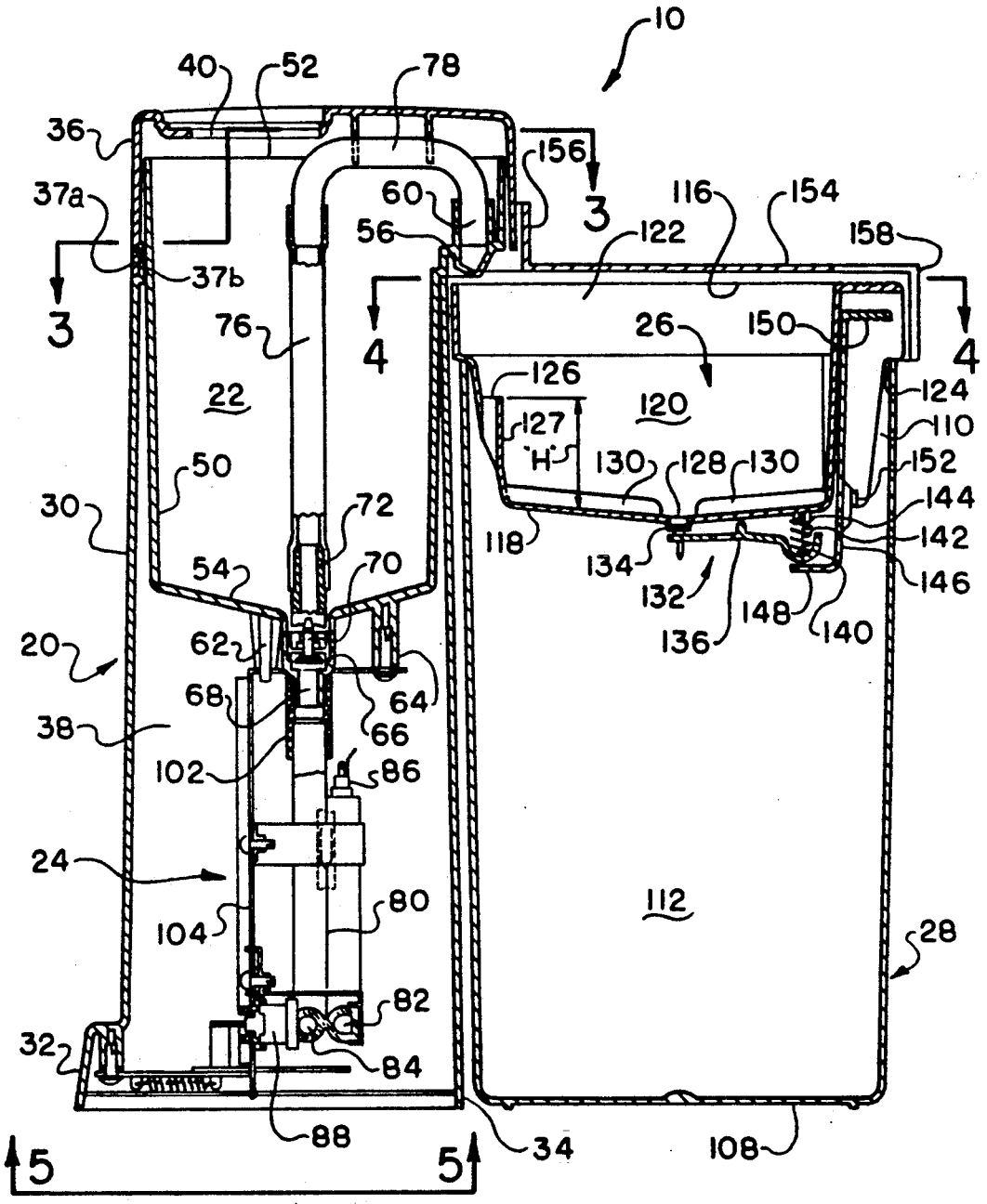
FIG. 2 is a sectional view [taken along line 2—2] of FIG. 1.
Figure 3:
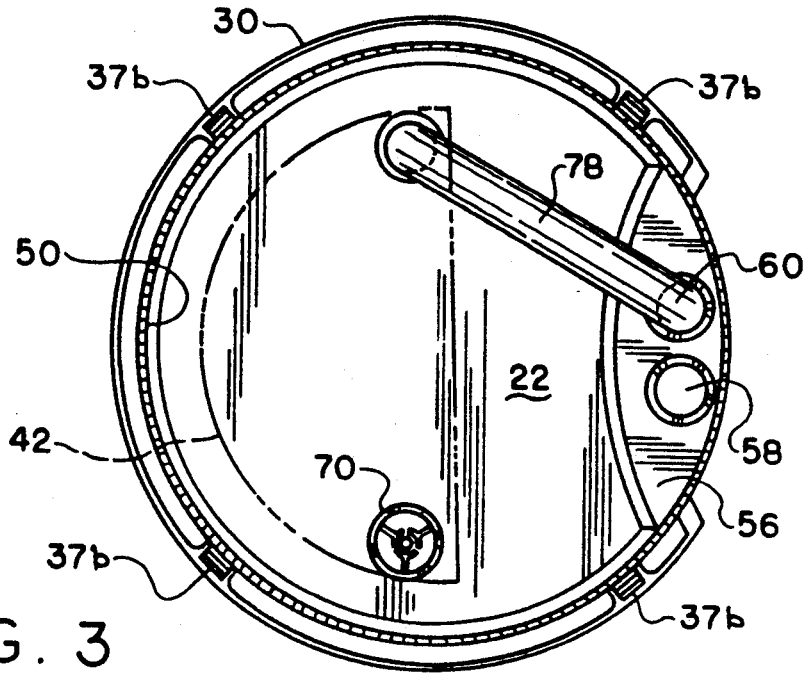
FIG. 3 is a plan view taken along line 3—3 of FIG. 2 showing the water reservoir and water transfer line of the appliance shown in FIG. 1.

Housing 20 is generally comprised of an elongated body 30 having a flared base portion 32 at the lower end thereof. In the embodiment of the invention shown, body 30 is substantially cylindrical in shape, but includes a cylindrical recess 34 along the length thereof (best seen in FIG. 5). Housing 20 also includes a cylindrical cap 36 attached to body 30 by interlocking tabs 37a, 37b. Together, body 30 and cap 36 define an internal cavity 38 containing reservoir 22 and heating unit 24. Cap 36 includes an opening 40 having a movable lid 42 (shown in phantom in FIG. 3), which opening 40 provides access to internal cavity 38, as best seen in FIG. 2.

Referring now to reservoir 22, the reservoir is generally comprised of an elongated cup-shaped member 50 having an open upper end 52 and a closed lower end 54. Cup-shaped member 50 is dimensioned to generally conform to the shape of body 30 and to be positioned therein as shown in FIG. 2. In this respect, cup-shaped member 50 has a cylindrical recess over a major portion of its length matching recess 34 and body 30. The upper most portion of cup 30 however (near open end 52) is fully cylindrical in shape, and defines a ledge 56 (best seen in FIG. 3) where the recessed portion of cup-shaped member 50 meets the fully cylindrical portion. Two ports or openings 58, 60 are integrally formed in ledge 56. Port 58 is basically an unrestricted opening and provides [and] *an* overflow aperture as will be described in greater detail below.

Figure 6:
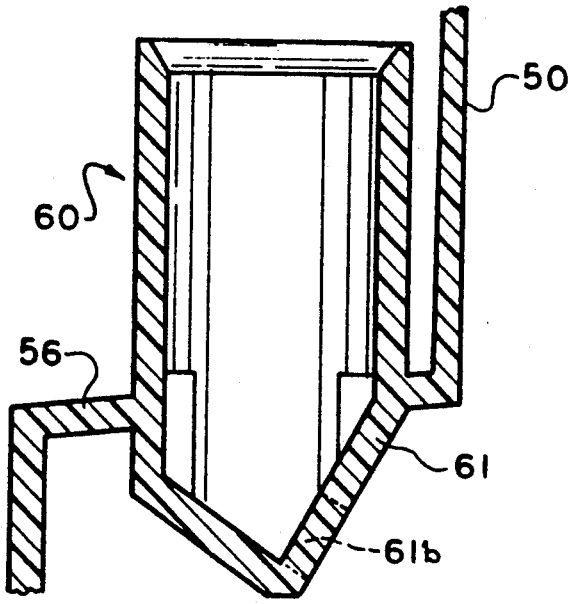
FIGS. 6 or 6a are enlarged views of [areas 6—6 of] FIG. 2 showing in section the hot water delivery nozzle of the appliance shown in FIG. 1.
Figure 6A:
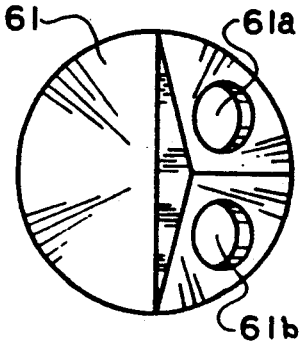

Port 60, best seen in FIGS. 6 and 6A, is generally comprised of a nozzle 61 having two side-by-side orifices 61a, 61b. Orifices 61a and 61b are preferably dimensioned to slightly restrict the flow of heated water from the heating unit 24 and to create a pressure build-up at port 60, wherein the heated water will be forced under such pressure from port 60. As will be appreciated, orifices 61a, 61b are oriented to direct the stream of heated water into container 26 which contains the coffee or tea to be brewed. Orifices 61a, 61b are preferably dimensioned to produce a pulsed stream when used with the heating unit 24 as hereinafter described.

The closed lower end 54 of cup-shaped member 50 includes mounting bosses 62, 64 for supporting member 50 in body 30. Closed end 54 also includes a downward extending tubular extension 66 having a tubular nipple 68 extending therefrom. Tubular extension 66 is dimensioned to receive a directional valve 70 permitting flow only out of reservoir 22. Cup-shaped member 50 also includes an upward extending nipple 72 disposed in the cavity defined by member 50, partially shown in FIG. 2. Upward extending nipple 72 is connected to port 60 by a length of tubing 76 and a generally U-shaped pipe 78.

Figure 5:
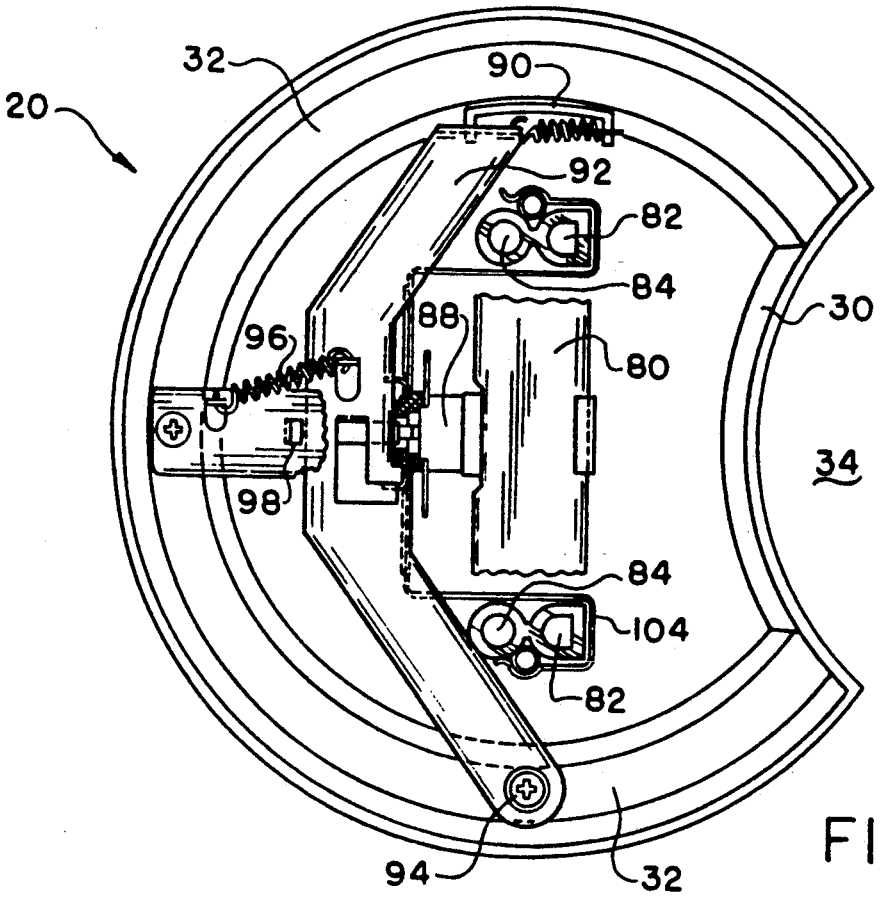
FIG. 5 is a plan view taken along line 5—5 of FIG. 2 showing the water heating arrangement and thermostat reset mechanism of the appliance shown in FIG. 1.

Referring now to heating unit 24, such unit in and of itself forms no part of the present invention and accordingly shall not be described in great detail. Heating unit 24 is generally comprised of a U-shaped heating element 80 of a type conventionally known and used in [automatically] *automatic* drip coffee makers. Broadly stated, heating element 80 is generally comprised of an aluminum extrusion having side-by-side passages 82, 84 extending therethrough. Passage 82 includes a ceramic heating core 86 therein. Heating core 86 is controlled by a resettable thermostat 88. Thermostat 88 is activated by a reciprocal switch 90 (best seen in FIG. 5) which extends through housing 20. Switch 90 is connected to a link 92 which resets the thermostat after a heating cycle has been completed and the thermostat has kicked out (turned off) the heating core [88] *86*. As best seen in FIG. 5, link 92 is pivotable about a pin 94 secured to flared base portion 32. A biasing spring 96 is operative together with a stop 98 to position link 92 in a normal position as shown in FIG. 5. Heating unit 24 is disposed within cavity 38 with the ends thereof aligned with tubular nipples 68 and 72 on cup-shaped member 50. Heat resistant tubing 102 connects passage 84 of element 80 to nipples 68, 72. A mounting bracket 104 is provided to support and orient heating unit 24 in housing 20 as well as to support reservoir 22 as shown in FIG. 2.

Figure 4:
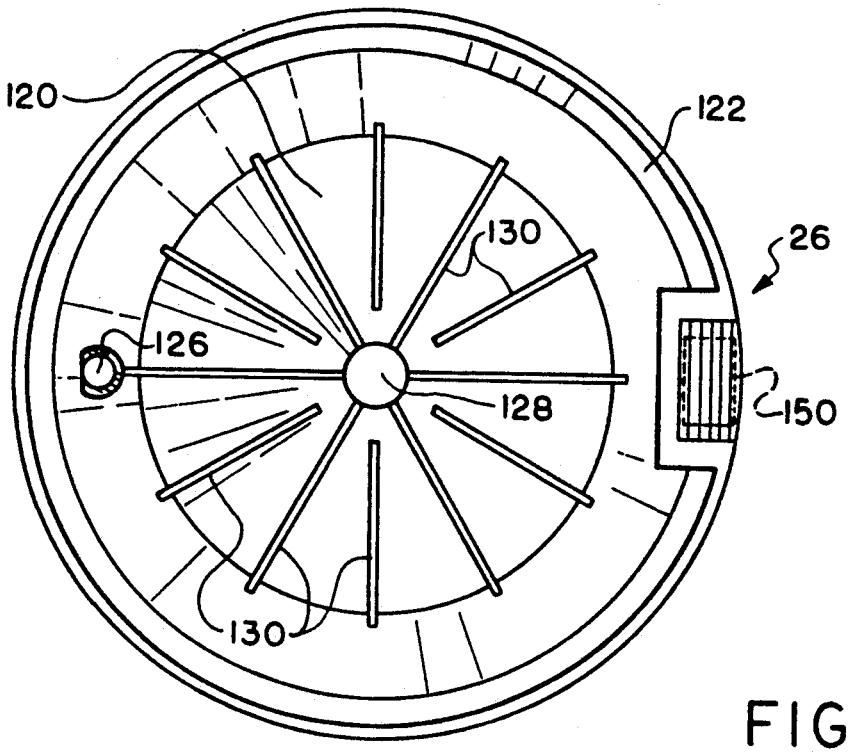
FIG. 4 is a plan view taken along line 4—4 of FIG. 2 showing the steeping or brewing chamber of the appliance shown in FIG. 1.

Referring now to FIGS. 2 and 4, container or brew funnel 26 and receptacle 28 are shown. In the embodiment disclosed, the brew funnel is adapted to be supported by receptacle 28 such that both may be positioned adjacent housing 20. In this respect, receptacle 28 is substantially cylindrical in shape and has a closed lower end 108 and an open upper end 110, and defines a cylindrical beverage holding cavity 112 therein. Importantly, the radius of curvature [diameter] of receptacle 22 is dimensioned to correspond to the radius of curvature of recess 34 in housing 20 such that receptacle 28 may be easily and accurately located in proper position against housing 20 by merely moving receptacle 28 into mating engagement with recess 34 of housing 20. Further in this respect, receptacles 28 and recess 34 are preferably dimensioned such that the inner diameter of receptacle 28 is slightly larger than the outer diameter of housing 20 to enable the receptacle to be placed over housing 20 in a telescoping manner for packaging and/or storage. Receptacle [22] *28* is preferably of a clear plastic material to facilitate viewing of beverage placed therein, and preferably includes a handle 113 thereon, as best seen *in FIG. 1.*

Referring now to container or brew funnel 26, such container is generally cylindrical in shape and has an open upper end 116 and a closed lower end 118. Container 26 defines [and] *an* inner cavity or "wetting" chamber 120 therein for holding tea, coffee or the like and in which heated water from heating unit 24 may be introduced. As set forth above, in the embodiment disclosed container 26 is supported by receptacle 28. To this end, container 26 includes a flared collar portion 122 at the open end 116 thereof, which collar portion 122 defines an annular surface 124 dimensioned to engage the upper edge of receptacle 28 as shown in FIG. 2. Receptacle 28 and container 26 are dimensioned such that when positioned adjacent housing 20 container 26 is positioned immediately below ports 58, 60 on ledge 56 of cup-shaped member 50. Container 26 includes an overflow port 126 disposed *at a* predetermined distance H above the bottom or lowermost surface of the wetting chamber 120. Distance H is preferably high enough for the water to completely cover any material placed in chamber 120, such as stacked tear bags or loose coffee or tea. In the embodiment shown, port 126 is defined by a vertical standpipe 127 integrally formed in container 26. Standpipe 127 and port 126 communicate with the beverage holding cavity 112 in receptacle 28 and are dimensioned to allow liquid from the wetting chamber 120 to spill into receptacle 28 when the liquid has reached the height H therein. Container 26 also includes a drain port 128 disposed at the lowermost portion thereof. Radial ribs 130 (best seen in FIG. 4) are provided on the upper surface of the closed end 118 of container 26 to facilitate drainage through drain port 128. In this respect, it will be appreciated that according to the present invention, a typical filter (not shown) is to be used in container 26 when loose coffee or tea is used therein.

A plug assembly 132 for opening and closing the drain port 128 is provided on the bottom surface of container 26. Assembly 132 includes a plug 134 operable to seal drain port 128, which plug 134 is fixed on a lever 136 pivotally mounted on mounts (not shown) formed on the bottom surface of container 26. One end of the lever 136 is dimensioned to form a cavity 140 to receive a compression spring 142 therein. A boss 144 on the lower surface of container 26 positions compression spring 142 relative to the cavity 140 on the lever 136. Compression spring 142 and the lever 136 in their normal position are operable to maintain plug 134 over drain port 128 thereby restricting flow therethrough. Operation of drain plug assembly 132 is controlled by a generally S-shaped actuator 146 having an actuator arm 148 disposed adjacent the spring 142, and a thumb tab 150 adjacent the open end of container 26. The actuator 146 is maintained along the side of container 26 by a guide 152 provided along the side thereof. Preferably, latch means (not shown) are provided on actuator 146 which enable the actuator to be locked in an up (drain port open) position.

A cover 154 dimensioned to fit over flared collar portion 122 of container 26 is provided to enclose the open end 116 of container 26. Cover 154 includes a recess portion 156 dimensioned to accommodate *the* cylindrical cap of housing 20 when container 26 and receptacle 28 are positioned thereagainst. Cover 154 also includes a notched portion 158 adjacent the thumb tab 150 of actuator 146 to facilitate access thereto by the user.

Referring now to the operation of the disclosed embodiment, to produce fresh iced tea using the embodiment disclosed, several trays of ice cubes (approximately three trays or about 36 [cubic inches] *ounces*) are placed within the beverage receiving cavity 112 of receptacle 28. Container 26 is placed in receptacle 28 as shown in FIG. 2. A typical coffee filter conventionally known and widely available is preferably inserted within container 26. A predetermined amount of tea (which may be loose or contained in tea bags) is placed in the filter in container 26. Cover 154 is then placed on container 26 and the receptacle 28 and container 26 are positioned adjacent body 20 in recess 34. With receptacle 28 and container 26 properly positioned adjacent housing 20, a predetermined amount of water (approximately 40 ounces) is inserted into reservoir 22 through opening 40 in cap 36. Directional valve 70 allows the water in reservoir 22 to fill passage 84 of heating unit 24. Switch 90 is then moved to an "on" position, which in turn moves lever 92 to reset thermostat 88 which in turn provides current to heating core 86. Heat generated by heating core 86 is conducted via the aluminum extrusion to the water in passage [82] *84*. As the water is heated, steam is formed in the passage [82] *84*. The heated water produces a directional flow up through hose 76 and U-shaped pipe 78 to port 60. In this respect, directional valve 70 restricts movement of heated water back into reservoir 22. Heating unit 24 produces pulse of hot water which are forced to nozzle 60. The orifice restrictions 61a, 61b at port 60 produce spurts or short streams of hot water to be directed into the chamber 120 of container 26. As heated water is directed into the chamber 120, plug 134, in its normally closed position restricts flow through drain port 128. As a result, the heated water begins to build up a head which submerges the tea within chamber 120. The water and steeping tea continue to build up a head within the wetting chamber 120 until it has reached the level H of outlet or overflow port 126. Importantly, until the head of water reaches the outlet port 126, the tea is steeping in the hot water maintained in [diameter] *chamber* 120. Also important, is that the pulses of hot water created by port 60 and orifices 61a, 61b are directed into the wetting chamber 120 and produce an agitating effect which further increases the interaction between the heated water and the tea. As the steeped tea reaches the overflow port 126, overflowing tea drops into the cavity 112 of receptacle 28 and is cooled by the ice therein. The steeping or brewing cycle continues as hot water is pulsed into the wetting chamber 120, and until the head of water is drained from container 26. With respect to the heating unit 24, once all the water has been heated and forced into the steeping chamber 120, the heating core 86 will heat to a temperature at which case thermostat 88 shall kick out the current to the heating unit 24. As set forth above, using a resettable thermostat, [enable] *enables* the heating unit to be recycled upon actuation of link 92 by switch 90. With respect to the heated water maintained in the container 26 (the water head), this water may be released by pinching the thumb tab 150 against the upper rim of container 26 thereby opening drain port 128. The head of liquid within the container is then drained into cavity 112 of the receptacle 28. With respect to the embodiment heretofore described, the water heated by the heating unit enters the container or brewing funnel at approximately 195° to 200° F. and is reduced to a temperature of approximately 42° F. in the ice contained in receptacle 28.

While the present invention has been described with respect to producing iced tea, it will be appreciated that iced coffee can easily be made with the present invention by merely inserting coffee in place of tea in the brewing funnel. Moreover, it will likewise be appreciated that the present invention can be modified to produce hot coffee or hot tea and that the improved brewing funnel, which creates and maintains consistently a predetermined brewing or steeping head of water, may be adapted and used in drip type coffee makers known heretofore. These and other alterations and modifications will become apparent to those skilled in the art after a reading of the present invention. It is intended that all such modifications and alterations by included insofar as they come within the scope of the patent as claimed or the equivalents thereof.

Having thus described the invention, the following is claimed:

1. An appliance for making iced coffee/tea comprising:

a housing, a reservoir within said housing for holding a predetermined amount of water, a heating system for heating said water, a receptacle for receiving brewed heated water, a container dimensioned to be supported in said receptacle, said container having a chamber adapted to receive coffee, tea or the like and having dispensing means for dispensing brewed, heated water into said receptacle, said dispensing means including overflow means for dispensing said brewed, heated water into said receptacle after said water reaches a certain height in said chamber, and, means for transferring heated water to said container, said means having orifice means for dispensing heated water into said chamber.

2. An appliance as defined in claim 1 wherein said dispensing means for said container further includes:

drain port means at a low portion of said chamber for selectively communicating with said receptacle, and valve means operable for opening and closing said drain port *means* to selectively dispense brewed, heated water into said receptacle.

3. An appliance as defined in claim 1 wherein said housing is generally cylindrical in shape[,] and [said means for locating is comprised of] *includes* a cylindrical recess [in said housing] *formed along one side thereof*, said recess having a radius of curvature generally equal to the radius of curvature of said receptacle *to receive said receptacle therein.*

4. An appliance as defined in claim 1 further comprising means for forcing said heated water [through said dispensing means] into said chamber.

5. An appliance as defined in claim 4 wherein said means for forcing is comprised of a flow restriction.

6. An appliance according to claim 5 wherein said flow restriction is an orifice.

7. An appliance as defined in claim 1 wherein said overflow means has inlet means a predetermined distance above the bottom of said chamber and outlet means in communication with said receptacle.

8. An appliance as defined in claim 1 wherein said container has a drain port at a low portion of said container, and closure means for selectively opening and closing said drain port, said closure means being normally closed to allow the brewing of water in said chamber and being openable to release the brewed water into said receptacle.

9. An appliance according to claim 8 wherein said closure means has a manually accessible means for opening said closure means.

10. An appliance according to claim 1 wherein said heating system includes means for supplying heated water under pressure to [said dispensing] *an* orifice, said [dispensing] orifice injecting said heated water into said chamber.

11. An appliance for automatically brewing a flavor-carrying material such as coffee, tea or the like comprising:

a reservoir for receiving a predetermined amount of water, means for heating said water, a container having a chamber *through which all said heated water passes* adapted to receive a predetermined maximum amount of said flavor-carrying material therein, said container including *a drain port at the bottom of said chamber*, [an] outlet [port] *means* disposed above the lowest portion of said chamber and above the highest level of said flavor-carrying material, said port *and said outlet means* communicating with a receptacle below said chamber for receiving brewed liquid, *and control means integral with said container for regulating flow through said drain port to regulate the amount of water within said chamber, the position of said control means relative to said drain port being manually adjustable*, and means for delivering heated water to said chamber.

12. An appliance as defined in claim 11 further comprising means for forcing said [heat] *heated* water into said chamber.

13. An appliance as defined in claim 11 wherein said means for delivering includes a restrictive nozzle operable to deliver said heated water to said container in pulsed streams.

14. An appliance for automatically brewing coffee, tea or the like comprising:

a reservoir for receiving a predetermined amount of water, means for heating said water, a container having a chamber adapted to receive coffee, tea or the like therein, said container including an outlet port disposed a predetermined distance above the lowest portion of said chamber, a drain port at the lowest point in said chamber and *manually operable* valve means *integral with said container* operable *on said container* for opening [an] *and* closing said drain port, said outlet port communicating with a receptacle below said chamber for receiving brewed liquid, and means for delivering heated water to said chamber.

15. In an appliance for automatically brewing coffee or tea, said appliance having means for providing heated water for brewing at a predetermined location [thereon] *therein*, a brew funnel for holding tea, coffee or the like for receiving heated water at said predetermined location, said brew funnel having:

a generally cylindrical shape, a closed lower end and an open upper end defining a chamber for receiving said coffee, tea and water, a first port located a predetermined distance above the lowest portion of said chamber, a second port located at the lowest portion of said chamber, said ports operable to drain liquid from said funnel, a plug associated with said second port movable between a first position closing said second port and a second position opening said port, means for biasing said plug to said first position, and lever means on said brew funnel for overcoming said biasing [mean] *means* to move said plug to said second position.

16. A brew funnel as defined in claim 15 further comprising latch means for maintaining said plug in said second position.

17. An appliance for [brewing coffee, tea or the like ] *making freshly brewed iced-tea* comprising:

an elongated *columnar* housing, a reservoir within said housing for receiving a predetermined amount of water, a heating unit within said housing for heating said water, a receptacle [for receiving] *dimensioned to receive* heated [water] *brewed tea and ice to cool said heated tea*, and a container dimensioned to be supported over said receptacle, said container having a chamber for receiving [coffee,]tea [or the like], *means for creating a head of heated water within said chamber* and [having] dispensing means for dispensing brewed, heated [water] *tea* into said receptacle, said housing and said receptacle being dimensioned such that said receptacle is telescopically received over said housing.

*18. A brew funnel for use in an appliance for automatically brewing coffee or tea, for holding tea, coffee or the like and receiving heated water, said brew funnel having:*

*a chamber for receiving said coffee, tea and water, said chamber having an open upper end,*

*a drain port located at the lowest portion of said chamber operable to drain liquid from said chamber,*

*a control member integral with said funnel for controlling flow through said drain port, said control member being manually positionable relative to said drain port to a position to regulate the amount of water in said chamber, and*

*overflow means within said chamber operable to drain liquid from said chamber when said liquid in said chamber has reached a predetermined height.*

*19. A brew funnel as defined in claim 18 wherein said control member is a plug movable between a first position closing said drain port and a second position opening said drain port.*

* * * * *